United States Patent
Bartlett et al.

[11] Patent Number: 6,137,775
[45] Date of Patent: Oct. 24, 2000

[54] SPARE CAPACITY PLANNING TOOL

[75] Inventors: Merwyn C. Bartlett, Plano, Tex.; Rajesh Kumar, Chennai, India; David G. Way, Garland, Tex.

[73] Assignee: MCI Communications Corporation, Washington, D.C.

[21] Appl. No.: 09/001,827

[22] Filed: Dec. 31, 1997

[51] Int. Cl.$^7$ .................................................. G01R 31/08
[52] U.S. Cl. ...................... 370/216; 370/225; 370/248; 714/4
[58] Field of Search ................................ 370/216, 217, 370/227, 228, 248, 225; 714/4

[56] References Cited

U.S. PATENT DOCUMENTS

| | | | |
|---|---|---|---|
| 4,956,835 | 9/1990 | Grover | 370/228 |
| 5,435,003 | 7/1995 | Chng et al. | 714/4 |
| 5,680,326 | 10/1997 | Russ et al. | 714/4 |
| 5,850,505 | 12/1998 | Grover et al. | 370/227 |
| 6,023,452 | 2/2000 | Shiragaki | 370/227 |
| 6,026,073 | 2/2000 | Brown et al. | 370/216 |

*Primary Examiner*—Chi H. Pham
*Assistant Examiner*—Maikhanh Tran

[57] ABSTRACT

A spare capacity planning tool for planning spare capacity in a transport network during a multiple-span failure following a single failure event. The spare capacity planning tool simulates restoration of a transport network regardless of the sequence of failures. The system and method utilize a permutation reducer to minimize the number of sequences to be verified during simulated or actual restoration activities. The permutation reducer reduces the number of sequences to to during simulated restoration activities to a first order function rather than a factorial function of the number of failed spans.

10 Claims, 7 Drawing Sheets

SPARE CAPACITY PLANNING TOOL

BACKGROUND OF THE INVENTION

1. Field of the Invention

The present invention relates to a telecommunications network, and in particular, to a spare capacity planning tool to restore a transport network when a single failure event causes multiple span failures.

2. Related Art

A spare capacity planning tool is a tool utilized to plan for service restoration in the event that a full or partial span in a transport network is lost. A transport network typically consists of nodes, links, spans and routes. Links, which carry circuits containing individual telephone lines, for example, are connected together at nodes. The set of all parallel links between two nodes is a span. Spans are connected together to form routes.

If spans are cut or broken, telecommunication service between two points may be interrupted. For example, an entire span or several links within a span may be lost as a result of a natural disaster, such as an earthquake, lightning, or a hurricane. A full or partial span also could be lost because of a human act, such as cutting into buried cables while digging with a backhoe. Because of the manner in which the network is connected, a failure at a single point could cause failures between several locations served by the telecommunications service provider.

If a span in the network is lost, service must be restored. That is, telecommunications traffic on the affected span must be re-routed. Historically, transport network restoration was performed manually by technicians physically disconnecting any failed portions of the network and replacing them with spare portions. In other words, failed portions were bypassed and traffic was re-routed around the failed portions utilizing spares. Today, however, automated restoration techniques are well known in the telecommunications industry, and are described, for example, in U.S. Pat. No. 4,956,835 to Grover and in Grover, W., "Distributed Restoration of the Transport Network," *Network Management Into the 21st Century*, Chapter 11, IEEE Press (1994).

Today, spare capacity planning is typically handled as a fault management function. The primary goal of fault management is the restoration of service in the presence of faults. As such, fault management must anticipate failures and minimize their occurrence. Proactive fault management strategies favor a network that allows for redundancy. Redundancy permits faulty links (within a span) to be promptly isolated and bypassed by spare links.

To restore telecommunication service, spare capacity is allocated throughout the network. Typically, there is more than one set of links between two nodes in a network. Redundancy is implemented by allocating many of these links as spare capacity. However, spare links constitute idle network capacity. Spare capacity planning tools determine the amount of spare capacity needed to ensure network restorability while controlling the costs associated with excess spare links.

Conventional spare capacity planning tools take into consideration the fact that a failure at a single physical point can affect more than one span. That is, designers of conventional spare capacity planning tools realize as a practical matter that conduits typically contain more than one span from numerous source locations to numerous other destination locations. As such, spare capacity planning tools allow for multiple failures in multiple spans caused by a single cut.

Most approaches to spare capacity planning involve a route calculation procedure to find at least one available route in a telecommunications network between any two given points. The available route found (or alternate route) must be capable of carrying all of the circuit-carried information (e.g., telephone calls) that must reach a particular destination.

A typical spare capacity planning tool provides a model for a given telecommunications transport network and offers a proposed allocation of spare links. By simulating network failures and restoration activities within the telecommunication network model, the spare capacity planning tool gauges the adequacy of the proposed allocation of spare links.

A limitation of conventional spare capacity planning tools is that they do not contemplate the sequence in which spans fail in a multiple span failure resulting from a single cut. The sequence in which the spans fail can be an important factor in the restorability of the network. If a spare capacity planning tool does not take into consideration the sequence in which spans fail during a single cut, then the tool may not ensure complete restoration of the transport network. What is needed, therefore, is a spare capacity planning tool that ensures complete restoration of all or substantially all of the failed capacity in the telecommunications transport network regardless of the quantity and sequence of spans that fail.

SUMMARY OF THE INVENTION

Briefly stated, the present invention is directed to a spare capacity planning tool for determining spare capacity in a telecommunications transport network to ensure complete or substantially complete restoration of the transport network following a single failure event. The present invention includes a system, method, and computer program product for planning spare capacity for a transport network. The transport network has a plurality of links, wherein each link is either a working link or a spare link. Each working link carries at least one live circuit and each spare link is capable of substituting for a working link during an actual or simulated failure. The transport network also includes a plurality of physical spans and a plurality of logical spans.

The spare capacity planning tool operates as follows. The spare capacity planning tool receives as input information representative of the number of working circuits included in the logical spans, information representative of the logical spans that are included in each of the physical spans, and information representative of the length of each of the physical spans. The spare capacity planning tool determines the maximum number of working circuits that could fail due to failure of any physical span as a result of a single failure event.

The spare capacity planning tool implements what may be termed a fractional-factorial heuristic (FFH) by performing as follows. The spare capacity planning tool initializes, for each physical span, a maximum number of spare links equal to the maximum number of logical spans that could potentially fail. The spare capacity planning tool then arranges the physical spans in order of decreasing physical length, selects the longest physical span (called the reduction span), and removes one of the spare links from the reduction span. The spare capacity planning tool then selects each additional physical span (and associated logical spans), in turn, and disables all of the working links and spare links associated with each such additional physical span in order to test whether the removal of the spare link from the reduction span is proper and verify if the network restores for all possible failure events. In an alternative embodiment, the spare capacity planning tool does not arrange the physical spans in order of physical length, and selects the reduction span at random.

If the transport network is restored following restoration activity, then the spare capacity planning tool attempts to remove another spare link from the reduction span. If, instead, the transport network has not been restored following the restoration activity, then the spare capacity planning tool adds a spare link back to the reduction span. Processing of the reduction span is then complete. The same procedure, i.e., reducing spare links, is then followed for every span in the network.

Further features and advantages of the invention, as well as the structure and operation of the various embodiments of the invention, are described in detail below with reference to the accompanying figures.

BRIEF DESCRIPTION OF THE FIGURES

The invention is thus understood by reference to the figures wherein figures of like reference numbers indicate identical or functionally similar elements. In addition, the left-most digits refer to the figure in which the reference first appears in the accompanying figures, in which.

DETAILED DESCRIPTION OF THE PREFERRED EMBODIMENTS

Overview of the Invention

The present invention is directed to a spare capacity planning tool for determining spare capacity in a telecommunications transport network which is capable of multiple span failures. The present invention ensures complete or substantially complete restoration of the transport network irrespective of the simulated and actual failure cut sequences. The spare capacity planning tool confirms restoration more efficiently by using an embedded permutation reducer to perform a fractional-factorial heuristic (FFH). The simulated failure cut sequence utilized by the spare capacity planning tool restoration algorithm can be different from the actual failure sequence without jeopardizing restoration effectiveness. Moreover, the number of sequences to be verified during simulated restoration activities is reduced to a first order function rather than a factorial function of the number of failed spans.

Example Environment

For illustrative purposes, the present invention is sometimes described in the context of a system and method used by a telecommunications service provider, such as an interexchange carrier. It should be understood, however, that the present invention is not limited to this environment. Instead, the present invention can be performed by any service provider (or public/private utility, such as gas and electric utilities, which typically have rights of way to almost every residential and business customer). For example, the present invention can be performed by owners and operators of a private network, by value added carriers, by cellular personal telecommunications service providers, or by satellite-based telecommunications service providers. That is, any of these entities may perform the spare capacity planning of the present invention.

Figure 1:
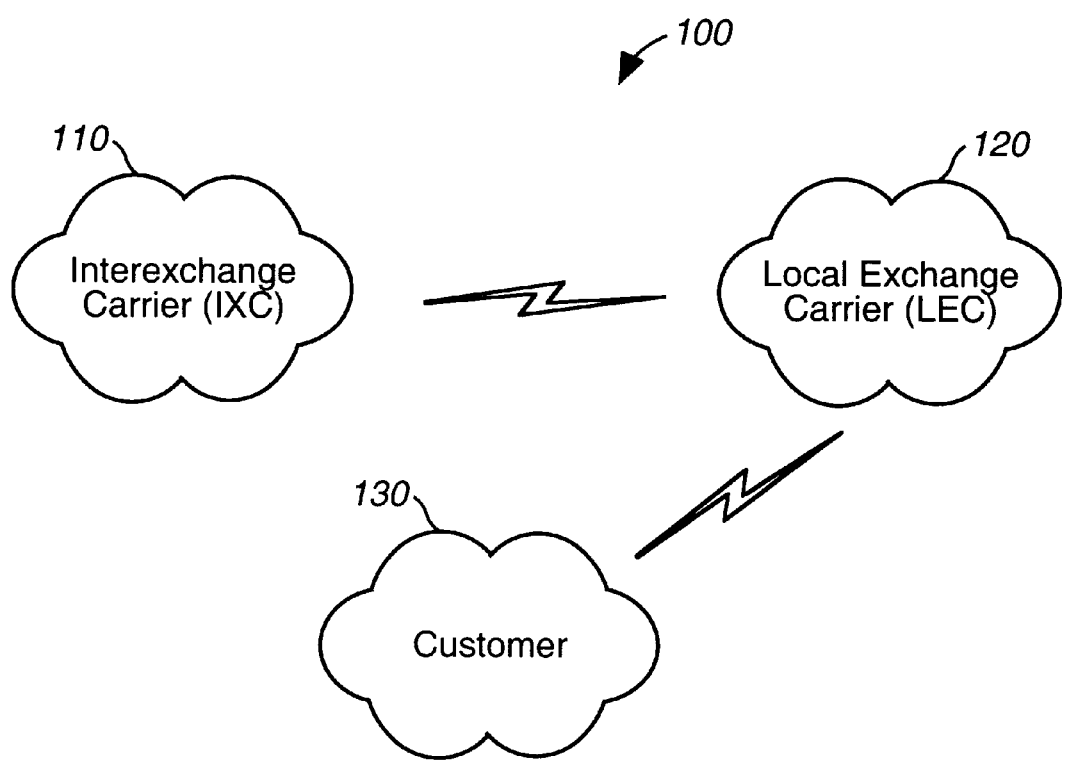
FIG. 1 is a block diagram of a telecommunications environment suitable for implementation of a preferred embodiment of the present invention.

FIG. 1 is a block diagram of a telecommunications environment 100 suitable for implementation of a preferred embodiment of the present invention. The telecommunications environment 100 includes a plurality of telecommunications service providers, such as an interexchange carrier 110, and a local exchange carrier 120. The telecommunications environment 100 also includes a customer 130.

As used herein, a "local exchange carrier" or "LEC" is a local telecommunications service provider. As used herein, an "interexchange carrier" or "IXC" is a long distance telecommunications service provider. A customer may be an individual homeowner, a small business, or a large multi-national corporation, for example. The IXC 110 provides telecommunication services to the customer 130 through the LEC 120.

Recall that the present invention may be implemented by any service provider. The service provider typically has physical and logical resources to transport services between two points in the service area. In the context of a telecommunications network, the physical and logical resources are collectively called a "transport network."

A transport network includes a plurality of links and nodes. The links and nodes are configured to provide spans, paths, and routes. A description of a transport network may include the quantity and relative location of nodes, the number of links between pairs of nodes, and the system demands, for example.

As used herein, the term "spare capacity planning tool" refers to a transport network modeling device that analyzes the spare capacity for a transport network. Commonly, a spare capacity planning tool emulates the actual transport network being analyzed. In other words, the spare capacity planning tool emulates the links, nodes, and routes, for example, of the transport network. It also emulates signals passed between nodes. A spare capacity planning tool may construct an internal working model of the transport network based upon a description of a real or hypothetical transport network. A discussion of the role of transport network modeling in a computer simulation environment is included in Frost, V. "Modeling in Simulation in Network Management," Network Management Into the 21st Century, Chapter 6, IEEE Press (1994).

As used herein, a "link" is an individual bidirectional point-to-point connection between nodes. A link may be designated by a transport network engineer as a working link or a spare link. A "working link" is a link that is designated to normally carry live circuits and is part of a working route through the transport network. A link that is designated as a "spare link" is a link that is fully equipped and operational but which does not normally transport live circuits. A spare link is not in service and is not part of any route through the transport network.

As used herein, a "circuit" represents a communication connection or signal that is routed through the transport network. A circuit corresponds to a large number of individual telephone lines. For example, a circuit may be a DS-3 signal, which carries 672 voice circuits. Similar functionality exists in STS-n signals and in OC-n signals, for example. A link is the carrier for a circuit or a plurality of circuits.

Figure 2:
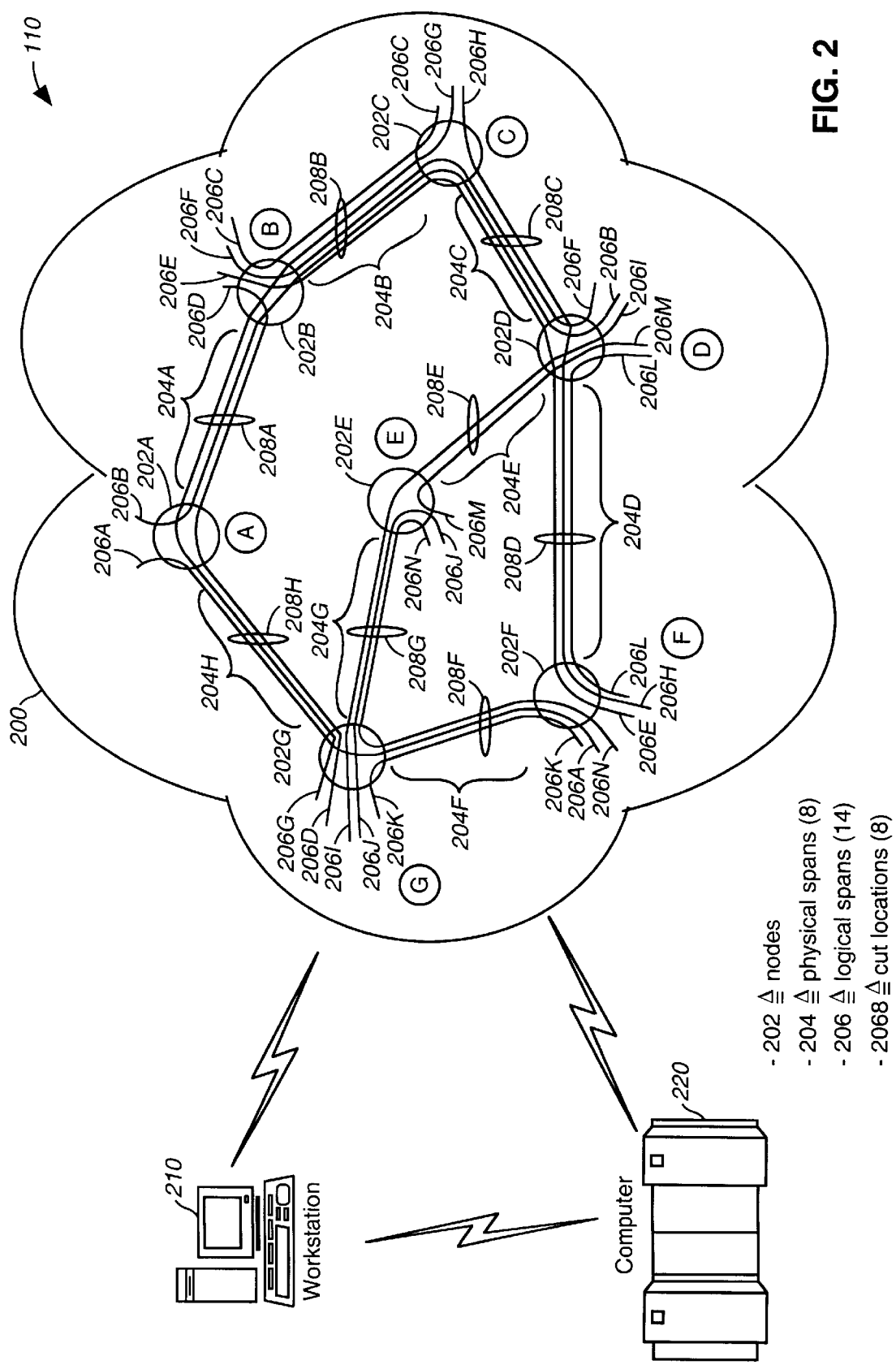
FIG. 2 is a block diagram of a telecommunication service provider.

FIG. 2 is a block diagram of a telecommunications service provider, such as the IXC 110. In a preferred embodiment, the IXC 110 includes a transport network 200, at least one workstation 210, and at least one computer 220. The workstation 210 is in communication with the computer 220. The computer 220 and the work station 210 are in communication with the transport network 200. The IXC 110 may include a plurality of workstations. For ease of explanation, however, only one workstation 210 is described.

The IXC 110 provides telecommunications services to the customer 130 via the transport network 200. The transport network 200 includes a plurality of nodes 202, as represented by the nodes 202A through 202G. As used herein, the term "node" refers to the point where links (either spare links or working links) are interconnected. Two nodes may have more than one link between them. Nodes are typically located in central offices or end offices which house local switching systems. A "central office" is a telecommunications service provider facility where the customer's 130 lines are joined to switching equipment. The central office connects one customer to another customer for local telecommunication service and for long distance telecommunication service. It is the central office which actually delivers the dial tone to the customer 130. An "end office" is a central office that is connected to the customer 130. An end office is typically the last central office before the customer's 130 phone equipment.

The switching equipment in a central office or an end office may be a "digital cross-connect system" or "DCS." A digital cross-connect system refers to a specialized type of high-speed data channel switching system. It is a digital switching matrix with an operations interface for setting up relatively static connections between input and output signals of channels. In other words, a digital cross-connect system receives separate and specific instructions to interconnect particular telecommunications lines.

A DCS establishes cross-connections using a plurality of "digital cross-connect switches" or "DXC" in response to the transport network's 200 needs. A DXC is a network element within the transport network. Commands to a DXC can be given by an operator at a console, such as at the workstation 210. Commands to a DXC may be programmed, by the computer 220, for example, to switch at certain times. This is because each DXC includes an embedded processor and a plurality of databases with which to perform assigned cross-connections. Digital cross-connect switches may also interconnect other network elements such as gateways, multiplexers, buffers, translators, etc.

The transport network 200 includes a plurality of origin/destination pairs of nodes, as represented by the origin/destination pairs 202A/202B, 202B/202C, 202C/202D, 202D/202E, 202D/202F, 202E/202G, 202F/202G, and 202G/202A. For example, one node 202A is the origin of the origin/destination pair and the other node 202B is the destination of the origin/destination pair of nodes.

The transport network 200 includes a plurality of spans. As used herein, the term "span" refers to the set of all parallel links between two nodes. A span may be a physical span or a logical span.

As used herein, a "physical span" is the set of all parallel links between two adjacent nodes. For example, physical span 204A is between node 202A and node 202B. As used herein, a "logical span" is the set of all parallel links between an origin node and a destination node, which are not necessarily physically adjacent. For example, logical span 206G connects node 202G and node 202C.

As used herein, the term "route" refers to a series of physical spans that a logical span passes through and their connections. Physical spans 204B, 204A, and 204H constitute a route. Note that physical span 204A is shown to comprise three parallel working links. These three links form portions of logical spans 206B, 206D, and 206G. An "express route" is a route where circuits through a node or a plurality of nodes are not terminated at the node. Thus, an express route bypasses a particular node. When a logical span passes through a node without going through any switches, an express route is formed. The result is that an express route cannot be restored at a location where it is not terminated.

Typically, there is a plurality of links (both working and spares) in a physical span or logical span. While FIG. 2 depicts no spare links, it is an object of the present invention to allocate spare links between physical spans during simulated or actual restoration activities. Upon a failure in transport network 200, the spare links would be used to form "alternate routes" to substitute failed working links.

As used herein, a "workstation" is a single user computer that has been specialized for a particular application. One specialized work station application is a computer simulation or modeling tool for a transport network. The execution of the computer simulation model is analogous to experimentation on the actual transport network. The workstation 210 may be connected to a mainframe or to a local or wide area network (LAN or WAN).

The transport network 200 is susceptible to cuts at a plurality of cut locations, as represented by cut locations 208A through 208H. A cut location represents a physical passage between two physically adjacent nodes. A single cut location may carry several logical spans. Because of express routes, logical spans may interconnect nodes other than the two physically proximal nodes.

As described above, a spare capacity planning tool emulates transport network 200 utilizing the workstation 210. It does so by utilizing a "logical span list" and a "cut file," for example. As used herein, a "logical span list" is one description of a network. It is a list that describes the distances (and other metrics) associated with each logical span. That is, a span list includes information on the number of working circuits on a logical span between given origin/destination pairs of nodes.

Table 1 below depicts an exemplar logical span list for the transport network 200. Each row in the logical span list includes a logical span number, an origin/destination pair, and a circuit capacity for that logical span.

TABLE 1

Logical Span List

| Logical Span # | Origin-Destination Pair of Nodes | Capacity per Logical Span (in DS-3s) |
|---|---|---|
| 206A | 202A/202F | 1 |
| 206B | 202A/202D | 1 |
| 206C | 202B/202C | 1 |
| 206D | 202B/202G | 1 |
| 206E | 202B/202F | 1 |
| 206F | 202B/202D | 1 |
| 206G | 202C/202G | 1 |
| 206H | 202C/202F | 1 |
| 206I | 202D/202G | 1 |
| 206J | 202E/202G | 1 |
| 206K | 202F/2020 | 1 |
| 206L | 202D/202F | 1 |
| 206M | 202D/202E | 1 |
| 206N | 202E/202F | 1 |

Table 1. Logical Span List

As described above the transport network 200 is susceptible to cuts at a plurality of cut locations, as represented by cut locations 208A through 208H. In order to properly analyze the effects of cuts at cut locations 208A through 208H, the present invention utilizes a cut file. As used herein, a "cut file" is a table that lists the logical spans which are included in each physical span.

A cut file is used to determine spare capacity requirements so that the transport network 200 is restored and failed circuits are re-routed. The spare capacity planning tool of the present invention is modified to accept a cut file. That is, the spare capacity planning tool utilizes the cut file information to allocate spare links on all physical spans in the transport network 200. A cut file is also used to verify restorability of the transport network 200.

Table 2 depicts an exemplar cut file for the transport network 200. Each row in the cut file represents one physical cut location and the logical span effected by the cut.

TABLE 2

| Cut File | |
|---|---|
| Cut Location | Affected Spans |
| 208A | 206B, 206D, 206G |
| 208B | 206B, 206C, 206E, 206F, 206G, |
| 208C | 206B, 206E, 206F, 206H, |
| 208D | 206E, 206H, 206L, |
| 208E | 206I, 206M |
| 208F | 206A, 206K, 206N |
| 208G | 206I, 206J, 206N |
| 208H | 206A, 206D, 206G |

Table 2. Cut File

Figure 3:
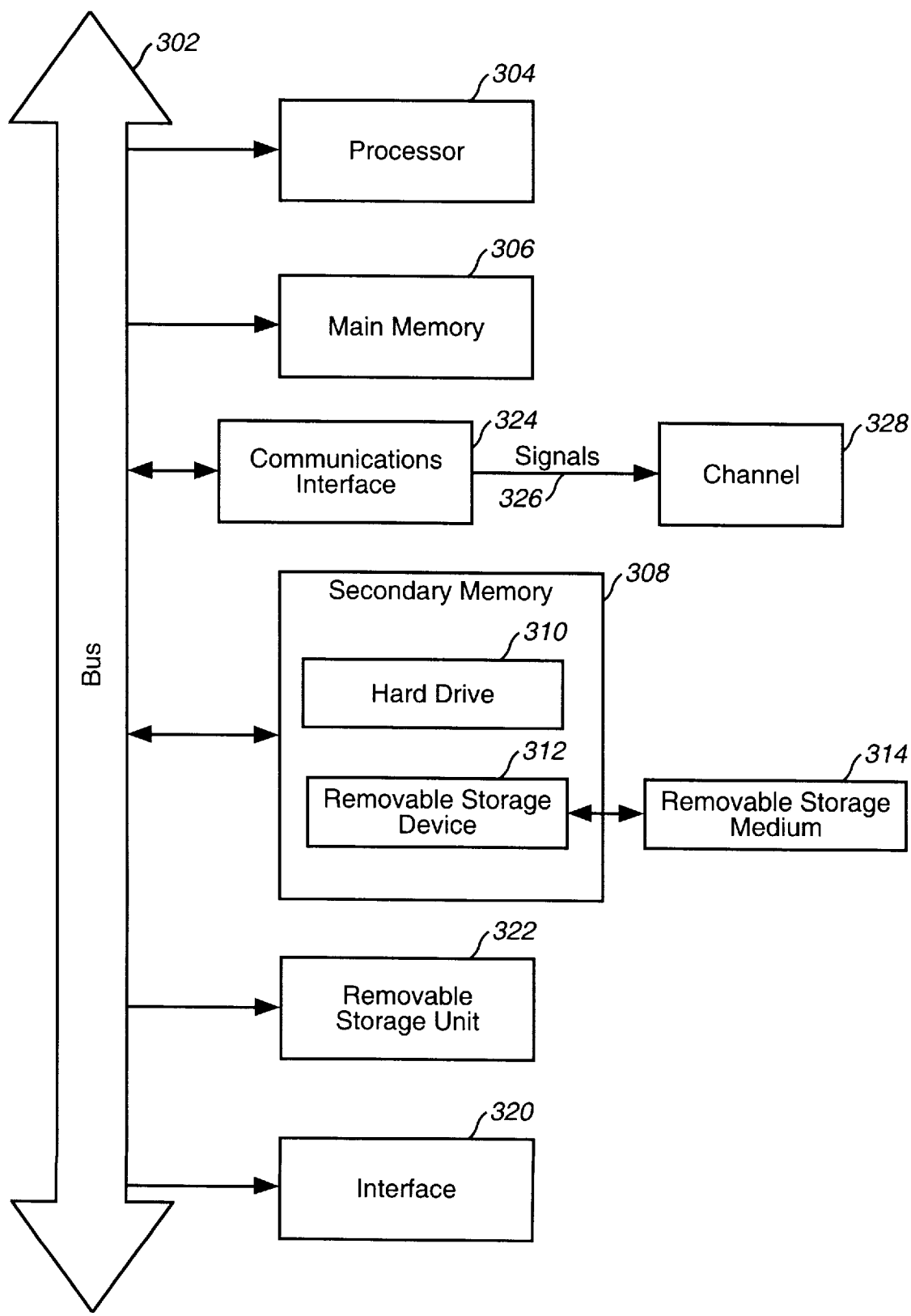
FIG. 3 is a block diagram of a computer system representative of a preferred implementation of many of the components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 300 is shown in FIG. 3. The computer system 300 includes a communication bus 302, one or more processors, such as processor 304. The processor 304 is connected to communication bus 302. Various software embodiments are described in terms of this example computer system. After reading this description, it will become apparent to a person skilled in the relevant art how to implement the invention using other computer systems and/or computer architectures.

Computer system 300 also includes a main memory 306, preferably random access memory (RAM), and may also include a secondary memory 308. The secondary memory 308 may include, for example, a hard disk drive 310 and/or a removable storage device 312, representing a floppy disk drive, a magnetic tape drive, an optical disk drive, etc. The removable storage device 312 reads from and/or writes to a removable storage medium 314 in a well known manner. Removable storage medium 314, represents a floppy disk, magnetic tape, optical disk, etc. which is read from and written to by removable storage device 312. As will be appreciated, the removable storage medium 314 includes a computer usable storage medium having stored therein computer software and/or data.

In alternatively embodiments, secondary memory 308 may include other similar means for allowing computer programs or other instructions to be loaded into computer system 300. Such means may include, for example, a removable storage unit 322 and an interface 320. Examples of such may include a program cartridge and cartridge interface (such as that found in video game devices), a removable memory chip (such as an EPROM or PROM) and associated socket, and other removable storage units 322 and interfaces 320 which allow software and data to be transferred from the removable storage medium 314 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a PCM-CIA slot and card, etc. Software and data transferred via communications interface 324 are in the form of signals 326 which can be electronic, electromagnetic, optical or other signals capable of being received by communications interface 324. These signals 326 are provided to communications interface via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 310, and signals 326. These computer program products are means for providing software to computer system 300.

Computer programs (also called computer control logic) are stored in main memory 306 and/or secondary memory 308. Computer programs may also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage device 312, hard drive 310 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 4:
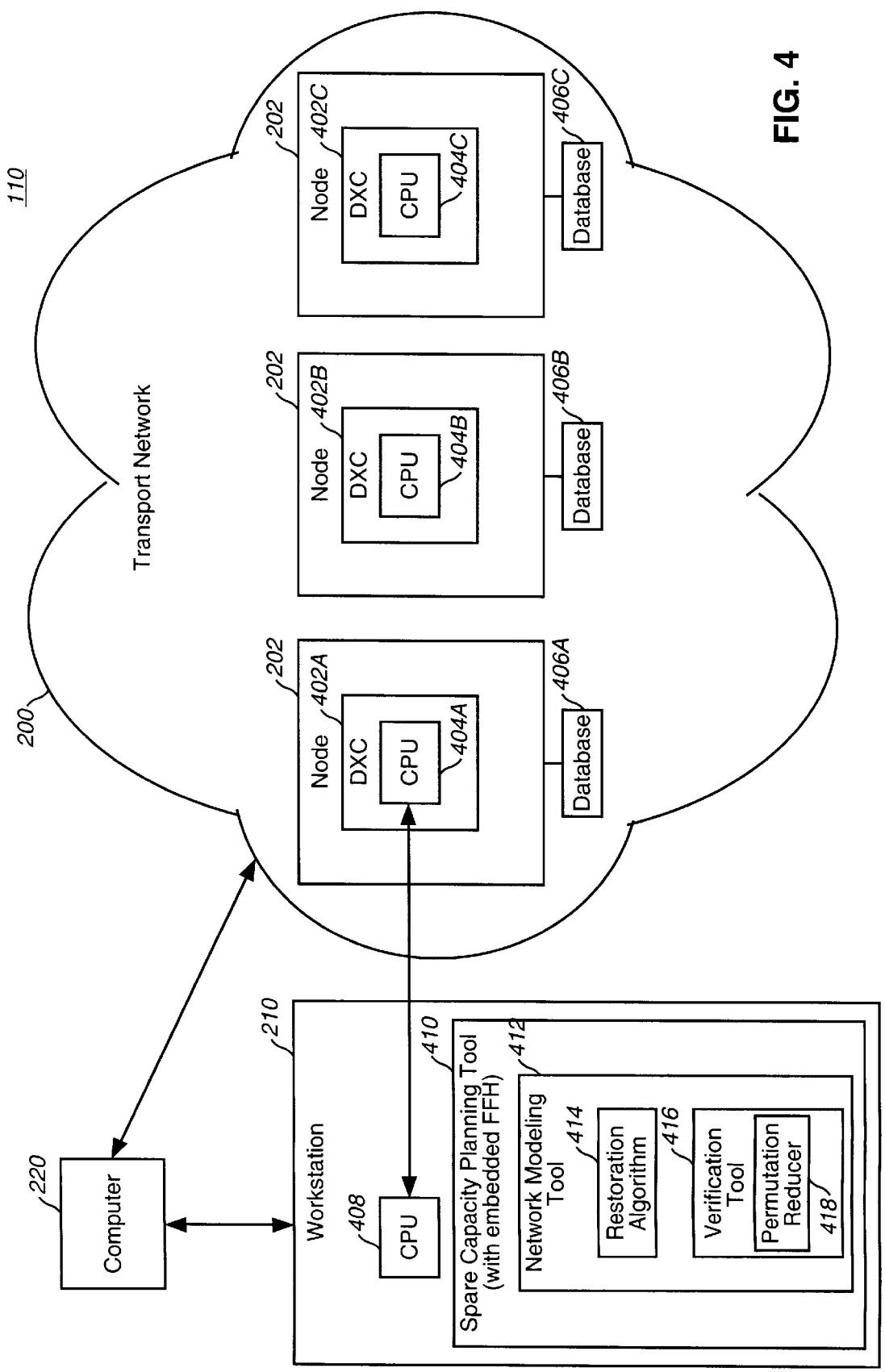
FIG. 4 is a more detailed block diagram of a telecommunication service provider.

FIG. 4 is a more detailed block diagram of a telecommunication service provider, such as the IXC 110. In a preferred embodiment, the IXC 110 includes the transport network 200, the computer 220, and the workstation 210. The transport network 200 communicates bi-directionally with the computer 220. The computer 220 bi-directionally communicates with the workstation 210. The work station 210 bi-directionally communicates with the transport network 200.

The transport network 200 includes a plurality of nodes 202, as described above. Each of the plurality of nodes include at least one digital cross-connect switch (DXC) 402. Each DXC 402 includes at least one embedded processor (or CPU) 404. Each node is coupled to a database 406. The DXC processor 404 bi-directionally communicates with the database 406.

The workstation 210 includes a workstation processor (or CPU) 408. Each workstation processor 408 is coupled to the plurality of DXC processors 404.

The workstation 210 includes at least one spare capacity planning tool 410. The spare capacity planning tool 410 includes a transport network modeling tool 412. The transport network modeling tool 412 includes a restoration algorithm 414 and a verification tool 416. The verification tool 416 is a heuristic that includes a permutation reducer 418. A "heuristic" is a problem-solving technique in which the best solution is selected iteratively. A heuristic uses trial and error or random searching.

The spare capacity planning tool 410 may be stored on a removable storage medium, such as the removable storage medium 314. Alternatively, the spare capacity planning tool 410 may be stored in a secondary memory, such as the secondary memory 308.

Conventional Spare Capacity Planning

Conventional spare capacity planning is described with respect to the following example. Suppose a construction crew were to dig under the pavement of a street where telecommunications lines were running in a conduit. The construction crew's backhoe digs too deeply and a physical span is cut. All circuits on the physical span are broken. This means that services, such as electronic fund transfers among banks, video teleconferences, facsimile service, electronic mail, and even conventional telephone service, that had been carried on this span would cease.

Typically, the telecommunications service provider already has contemplated a cut at this location as a part of its proactive fault management strategy. The telecommunications service provider utilizes a conventional spare capacity planning tool to determine the optimal placement of spare capacity within the telecommunications network.

The conventional spare capacity planning tool proposes a particular allocation of spare links by simulating failures in the transport network. The spare capacity planning tool then simulates restoration of the transport network in order to assess the effectiveness of a proposed allocation of spare links.

Conventional spare capacity planning tools, however, do not contemplate the sequence in which spans fail. The sequence in which the spans fail can be an important factor in the effectiveness in the allocation of spare links within the telecommunication network.

For example, if, the construction crew severs the transport network 200 cut location 208A, then three logical spans are affected. That is, logical span 206B, logical span 206D, and logical span 206G would be cut. The logical spans 206B, 206D and 206G may fail in a variety of sequences. Failure of logical span 206B, 206D and 206G may be simultaneous, sequential, or a mixture thereof.

The number of sequences in which the affected spans may fail is a factorial function of the total number of logical spans affected by the cut. The number of sequences in which the affected spans can fail would be 3! or 6. Likewise, if a cut were to occur at cut location 208B, then the number of sequences in which the affected spans (i.e., 206B, 206C, 206E, 206F and 206G) could fail would be 5! or 120 possible sequences. In a typical transport network, it is not uncommon to have ten or twenty logical spans in a physical span. That is, there may be more than 3.6 million sequences to be evaluated in simulated restoration activities for a typical transport network.

For a given transport network with a proposed spare capacity allocation, the degree of recovery from a multiple span failure may be dependent upon the specific sequence of span failure. This is due to the possibility of "blocking" or "traps" wherein the actions taken to restore one failed logical span consume spare resources that are needed to restore a later failed logical span. A spare capacity planning tool that can evaluate many possible span failure sequences is apt to detect weaknesses in a proposed spare allocation plan.

Conventional spare capacity planning tools that do not take failure sequences into account can easily overlook specific failure sequences that cause incomplete restoration. Use of such a tool by a transport network designer can result in a latent inadequacy of spare allocation for a given network.

In many cases of restoration traps, the restoration actions may be chosen more effectively so that all failed spans may be restored. Therefore, a spare capacity planning tool that can evaluate many possible span failure sequences is also valuable for detecting weaknesses in a restoration algorithm in conjunction with a proposed spare allocation plan.

To illustrate a potential trap, a conventional spare capacity planning tool might consider a failure at location 208F in FIG. 2. With respect to restoring logical spans 206N and 206A (ignoring 206K for this discussion), the conventional spare capacity planning tool may equip the network with two spare links at physical span 204D and one spare link on all other physical spans. This spare plan would seem adequate because 206N could restore through node 202D while 206A could restore through nodes 202D, 202C, and 202B. Yet, if 206A actually fails first, it is likely that restoration of this logical span will proceed through nodes 202D, 202E, and 202G. If this happens, then the subsequent failure of 206N is unrestorable because the spare needed along span 204E has already been used to restore 206N.

Thus, without being able to consider failure sequences, conventional spare capacity planning tools are limited in the ability to ensure complete restoration of the transport network. This is especially true for progressive span cuts.

Spare Capacity Planning Tool with a Permutation Reducer

The spare capacity planning tool of the present invention plans spare capacity in order to effect complete or substantially complete restoration of the transport network 200. An advantage of the present invention is that complete or substantially complete restoration is effected regardless of the sequence in which the affected logical spans fail.

A solution to the limitations of conventional spare capacity planning tools contemplated by the present invention is to consider every possible sequence of failure of a logical span because of a failure at a particular cut location. This solution is time-consuming and, in large transport networks, impractical. This is because for n failed logical spans, the number of sequences to be verified in order to ensure complete or substantially complete restoration is n factorial. For instance, referring to FIG. 2, a cut at cut location 208C would require verifying 4! or 24 sequences. It is unlikely, however, that the number of failed logical spans would be limited to such a small number as four or even five. What is more likely is that the spare capacity planning tool would need to restore a much greater number of logical spans. For this reason, conventional spare capacity planning tools take into consideration few, if any, different failure sequences. Thus, transport network restoration is assured only when the logical span failures occur in the same sequence that was contemplated by the spare capacity planning tool.

A feature of the spare capacity planning tool of the present invention is that it effects complete or substantially complete restoration of the transport network 200 without having to consider all of the possible sequences of failure due to a cut at a single cut location. This feature is particularly useful in large transport networks. In practice, spare capacity planning tools cannot take all failure sequences into consideration. The calculation burden quickly becomes unmanageable. The spare capacity planning tool of the present invention utilizes the permutation reducer 418, as depicted in FIG. 4, in order to reduce the number of possible sequences to verify following a cut at a single cut location, thereby reducing the number of calculations. The permutation reducer 418 of the present invention provides the particular sequences to be verified. For example, using a conventional spare capacity planning tool, a cut at cut location 208B, as depicted in FIG. 2, would require 5! or 120 sequences to be verified. The present invention, however, derives a small subset of all possible sequences. That is, the permutation reducer 418 of the present invention as applied to the above described example reduces the number of sequences to be verified to ten or two times the number of failed logical spans. Moreover, the permutation reducer 418 specifies the appropriate ten sequences to be verified. The spare capacity planning tool does not have to consider all 120 possible sequences in order to ensure complete or substantially complete restoration of the transport network. The ten sequences can be chosen in such an evenly distributed manner as to adequately represent all the possible sequences. The selection process is described in greater detail below.

Referring now to FIG. 4, the spare capacity planning tool 410 of the present invention utilizes the network modeling tool 412, the restoration algorithm 414, the verification tool 416, and the permutation reducer 418 in order to test the restorability of the transport network 200. The spare capacity planning tool 410 of the present invention emulates the topology of the transport network 200. It does so by being tightly coupled to the processors 404 so as to receive inputs from the databases 406 and the digital cross-connect switches 402. The spare capacity planning tool 410 thus maintains knowledge of the transport network 200 metrics. The spare capacity planning tool 410 is capable of accepting and utilizing a cut file, such as the cut file depicted in Table 2. Additionally, the spare capacity planning tool 410 is capable of accepting and utilizing a logical span list, such as the logical span list depicted in Table 1.

Figure 5A:
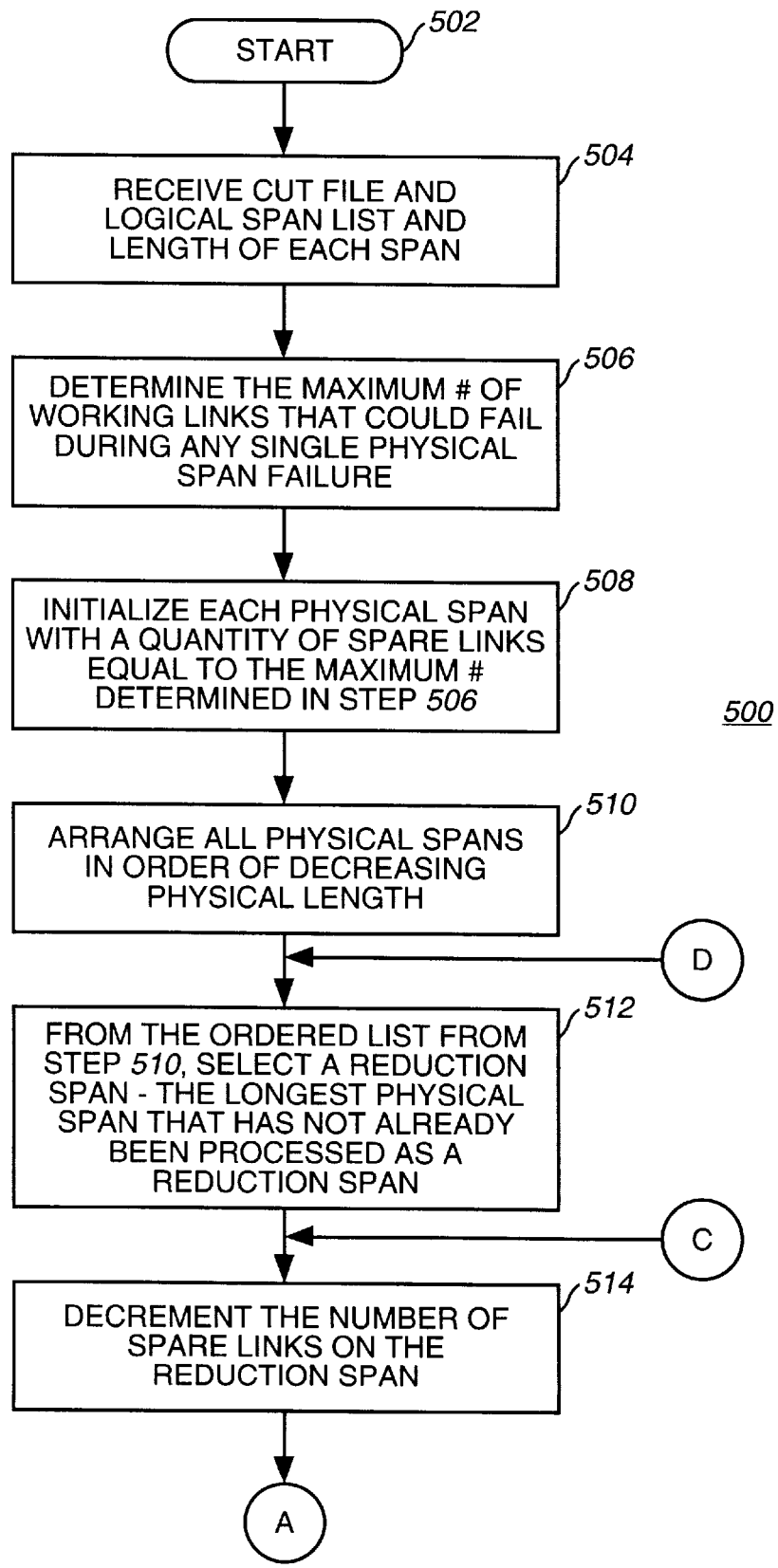
FIGS. 5A, 5B, and 5C are flowcharts that are representative of the operation of a preferred embodiment of the present invention.
Figure 5B:
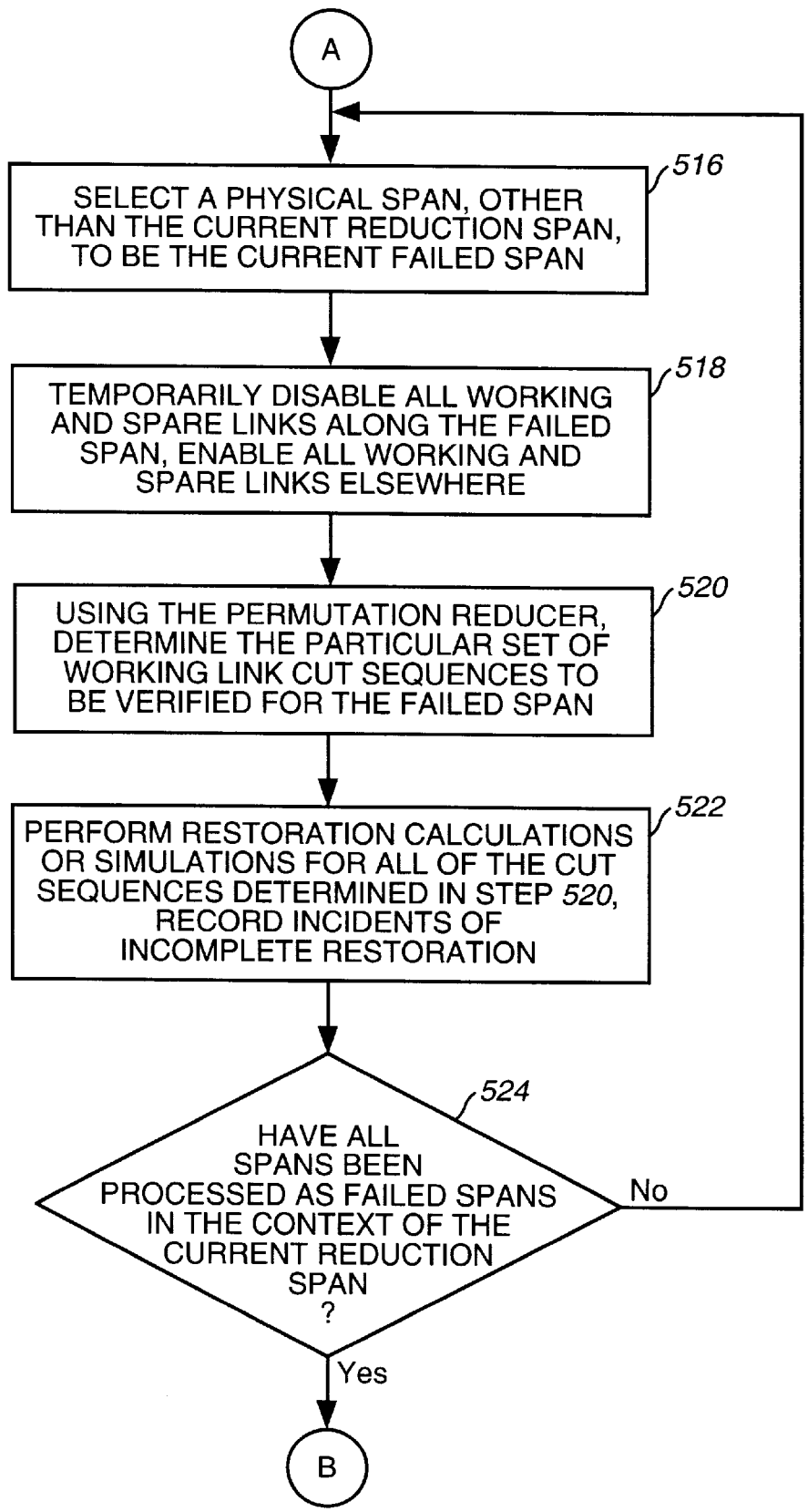
Figure 5C:
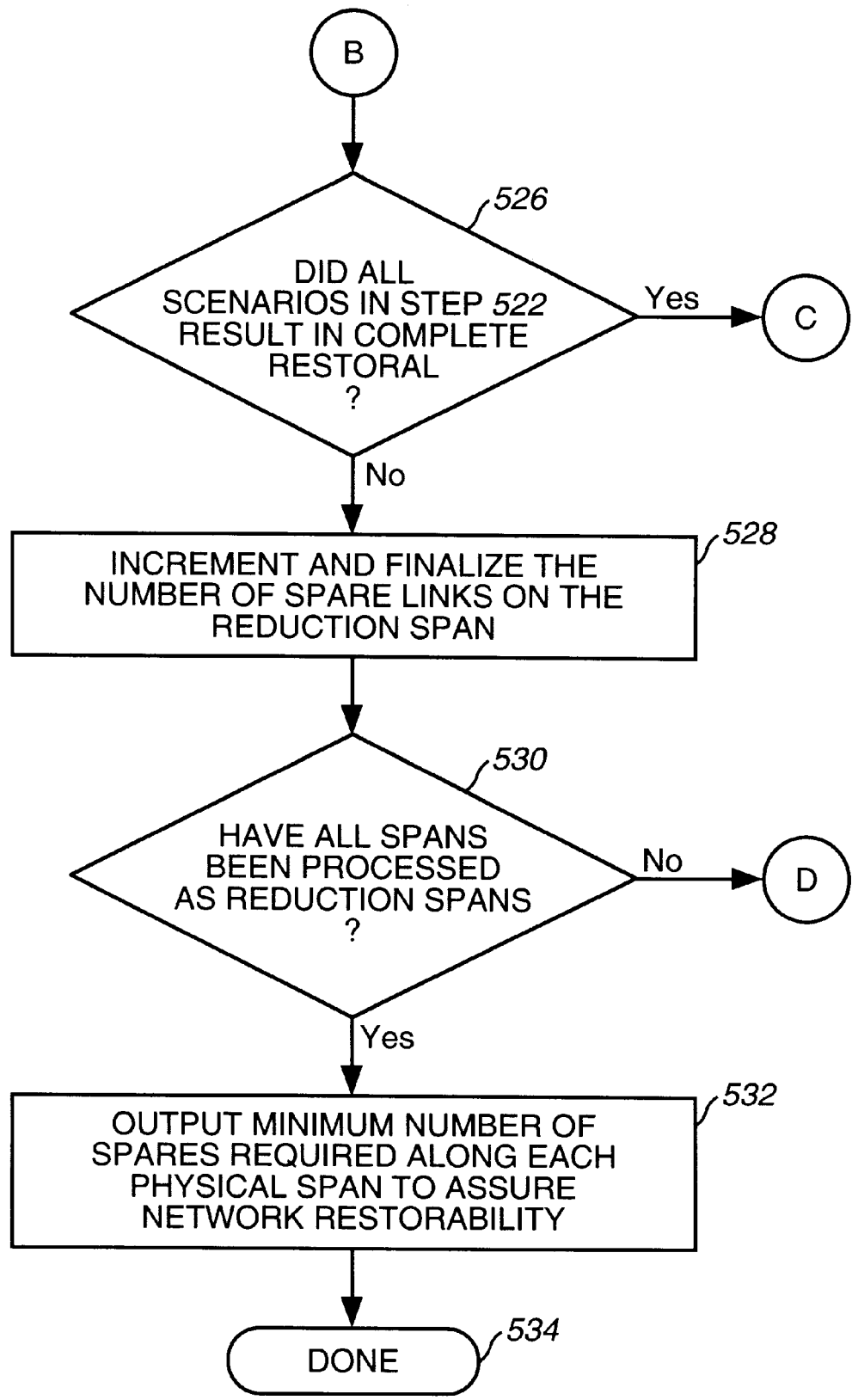

The spare capacity planning tool of the present invention, which uses an embedded permutation reducer 418 to achieve a fractional-factorial heuristic, is described with reference to FIG. 5. FIG. 5 is a flowchart 500 of the operation of a preferred embodiment of the present invention. The spare capacity planning tool with the permutation reducer 418 of the present invention is also described with reference to FIG. 2 and FIG. 4. The flowchart 500 begins with step 502 as the process is invoked to plan spare capacity for a given network. Control then immediately passes to step 504.

In step 504, the spare capacity planning tool 410 receives a description of the network to be analyzed. The spare capacity planning tool 410 receives a logical span list pertaining to the network, such as that depicted in Table 1 pertaining to transport network 200. Also in step 504, the spare capacity planning tool receives a cut file that describes which logical spans are present in each physical span within the network. Finally, in step 504, the length of each physical span is provided to the spare capacity planning tool.

In step 506, the spare capacity planning tool 410 determines the maximum number of working links which could fail in any single physical span as a result of a single failure event. For example, in the transport network 200, a cut physical span 204A at cut location 208A would result in the failure of three logical spans: 206B, 206D, and 206G. Similarly, a cut in physical span 204B at cut location 208B would result in the loss of a maximum of five logical spans: 206B, 206C, 206E, 206F, and 206G. Likewise, a cut in physical span 204C at cut location 208C would result in the loss of a maximum of four logical spans: 206B, 206E, 206F, and 206H.

In step 508, the spare capacity planning tool 410 initially allots to each physical span a maximum number of spare links equal to the maximum number of working links which could fail as determined in step 506. For example, for transport network 200, the spare capacity planning tool 410 would initialize five spare links on each physical span. This is because the maximum number of working links that fail due to a single failure event is five corresponding to cut location 208B. This initial allotment of spares assures that the network is fully restorable at the outset of the analysis process.

In step 510, the spare capacity planning tool 410 arranges all physical spans in order of decreasing length based upon the physical span lengths entered in step 504. For the example network 200, the spare capacity planning tool 410 would arrange the physical spans in the following order: 204D, 204A, 204G, 204H, 204B, 204C, 204F, 204E.

In step 512, the spare capacity planning tool 410 consults the ordered list of physical spans compiled in step 510. Disregarding any spans which may have already been processed as such, the spare capacity planning tool selects the longest of these physical spans to be designated as the so-called "reduction span." Subsequent processing in steps 514 through 530 will seek to determine the minimum number of spares required along the reduction span to assure network restorability.

Note that, as implemented in step 510, longer spans are analyzed first in order to minimize network costs. A span chosen to be the reduction span early in the analysis, when the remainder of the network still has an excess of spares, is likely to require fewer spares. A long spare link is more costly than a short spare link. For the example network 200, the spare capacity planning tool 410 in a preferred embodiment would therefore select physical span 204D on the first pass through step 512.

In step 514, the spare capacity planning tool 410 removes one spare link from the physical span selected in step 512. That is, the spare capacity planning tool 410 would decrease by one the number of available spare links along physical span 204D.

In step 516, the spare capacity planning tool selects a physical span, other than the currently selected reduction span, to serve as the so-called "failed span." This failed span is the context for processing in steps 518 through 522.

In step 518, the spare capacity planning tool renders unavailable all of the links on the failed span chosen in step 516. For the example network 200, the spare capacity planning tool 410 may select span 204B as the failed span and temporarily disable its original five working links plus the five spare links allotted to it in step 508.

In step 520, the spare capacity planning tool 410 utilizes the permutation reducer 418 to determine a set of cut sequences to be applied to the failed span. This set is a subset of all of the permutations of cut sequences possible given the number of logical spans within the failed span selected in step 516. For the example of span 204B in network 200, the permutation reducer 418 would create a set of cut sequences as depicted in Table 3, given below, based upon the span list that was input in step 504. The first sequence is simply the list of logical spans in the same order as depicted in the span list. To generate the next sequence, permutation reducer 418 performs a positional rotation of the entries in the span list, shifting all span entries by one position and moving the last entry to the first position. This is repeated to create subsequent entries until the results of the rotation are equivalent to the original sequence. In the case of span 204B, this creates the first five entries in Table 3.

TABLE 3

Reduced Permutations

| | |
|---|---|
| Initial Sequence | 206B, 206C, 206E, 206F, 206G |
| Second Sequence | 206G, 206B, 206C, 206E, 206F |
| Third Sequence | 206F, 206G, 206B, 206C, 206B |
| Fourth Sequence | 206E, 206F, 206G, 206B, 206C |
| Fifth Sequence | 206C, 206E, 206F, 206G, 206B |
| Sixth Sequence | 206G, 206F, 206E, 206C, 206B |
| Seventh Sequence | 206F, 206E, 206C, 206B, 206G |
| Eighth Sequence | 206E, 206C, 206B, 206G, 206F |
| Ninth Sequence | 206C, 206B, 206G, 206F, 206E |
| Tenth Sequence | 206B, 206G, 206F, 206E, 206C |

Table 3. Reduced Permutations

The other five entries in Table 3 are created by reversing the order of spans in the initial sequence and then performing positional rotations again. In a preferred embodiment, the action of permutation reducer 418 generates a number of cut sequences equal to two times the number of logical spans in the failed physical span.

In step 522, the spare capacity planning tool 410 performs a series of calculations or simulations to model the behavior of the network in response to each of the cut sequences generated in step 520. There are numerous well-known tools and techniques for modeling network behavior in response to a failure. In accordance with the present invention, these are adapted to model cut sequences, for example, by the controlled dispatching of a series of failure notification messages. Regardless of how the simulation is carried out, the present invention only requires the simulation to provide some indicator of whether or not all failed spans were successfully restored in the course of a failure simulation. In step 522, any incidents of incomplete restoration are noted.

Step 524 implements an execution loop to assure that all physical spans, other than the current reduction span, are processed in the role of a failed span in step 516 through step 522.

In step 526, a decision is made based upon whether any instances of incomplete restoration were noted during iterations of step 522 in the context of the current reduction span. If all failure scenarios verified by step 522 resulted in complete restoration, then execution resumes at step 514, whereby the number of spares along the reduction span is further decremented and the failure scenarios are repeated.

If, on the other hand, some instances of incomplete restoration were noted in step 522, the lower limit of the number of spares required along the reduction span is deemed to have been found and execution proceeds to step 528.

Step 528 accomplishes incrementing by increasing by one the number of spares along the current reduction span and then finalizing this value for that physical span for the remainder of the planning process. This final value will be reported as the minimum spare allocation for the physical span. This value also replaces the previous allocation made in step 508 and serves as the number of available spares for the given physical span in all subsequent simulations as other spans take on the role of the reduction span.

After the minimum spare value for a reduction span is finalized in step 528, step 530 assures that any remaining physical spans that have not yet assumed the role of reduction span are handled by returning to step 512.

In step 532, the minimum spare allocations which were finalized for each physical span in iterations of step 528 are provided as output from the process in the form of a table or list for example. Operation of the preferred embodiment of the spare capacity planning tool is then complete, as represented by step 534.

Conclusion

While the invention has been particularly shown and described with reference to preferred embodiments thereof, it would be understood by those skilled in the art that various changes in form and details may be made therein without departing from the spirit and scope of the invention.

For example, those skilled in the art will recognize that the present invention may be adapted to consider so-called "glassthrough" spares. The term "glassthrough" refers to an optical link which physically passes through one or more intermediate nodes without being connected to switching equipment within the nodes. To include glassthrough spares in the analysis according to the present invention, each physical and each logical span is initially equipped with an excess of spares. Equipping each logical span with spares equates to adding tentative glassthroughs between the endpoints of the logical span. As the reduction spans are sorted by length, the glassthroughs will tend to be eliminated first for being longer and presumably more expensive on average. Analysis of a given network may also proceed in two phases, e.g. with and without glassthroughs, followed by a cost comparison to select one of the two resulting sparing plans.

What is claimed is:

1. A method of planning spare capacity for a communication network, the network including a plurality of logical spans and a plurality of physical spans, the network further having a plurality of links, each link being either a working link or a spare link, wherein each working link carries at least one live circuit and each spare link is capable of substituting for any working link during one or more failure events, the failure events including both actual failures and simulated failures, the method comprising the steps of:

(1) determining a maximum number of working links that could fail due to failure of any physical span;

(2) initializing for each physical span a maximum number of spare links equal to said maximum number of working links as determined in step (1);

(3) selecting a first physical span, said first physical span being known as a reduction span, all other physical spans being known as non-reduction spans;

(4) removing a first spare link from said reduction span;

(5) selecting one of said non-reduction spans as a designated non-reduction span;

(6) temporarily disabling the working links and the spare links associated with said designated non-reduction span;

(7) monitoring the communication network to determine a network response; and (8) determining, based on said network response, whether failed spans in the communication network were restored.

2. The method of claim 1, wherein in step (8), all failed spans did restore, step (8) further comprising the steps of:

(a) re-enabling said designated non-reduction span;

(b) selecting a next non-reduction span to be said designated non-reduction span; and (c) repeating steps (6)–(8) until all of said non-reduction spans have been used as said designated non-reduction span.

3. The method of claim 2, wherein in step (8)(c), all of said non-reduction spans have been used as said designated non-reduction spans, step (8)(c) further comprising the steps of:

(i) removing a next spare link from said reduction span; and (ii) repeating steps (5)–(8).

4. The method of claim 1, wherein in step (8), all failed spans did not restore, step (8) further comprising the steps of:

(a) replacing one spare link to said reduction span;

(b) selecting a next physical span to be said reduction span;

(c) repeating steps (4)–(8) until all of said physical spans have been selected as said reduction span.

5. The method of claim 1, wherein in step (3) said reduction spans are selected sequentially in order of physical length, said first physical span being the longest.

6. A system of planning spare capacity for a communication network, the network including a plurality of logical spans and a plurality of physical spans, the network further having a plurality of links, each link being either a working link or a spare link, wherein each working link carries at least one live circuit and each spare ink is capable of substituting for any working link during one or more failure events, the failure events including both actual failures and simulated failures, the system comprising:

means for determining a maximum number of working links that could fail due to failure of any single physical span;

means for initializing for each physical span a maximum number of spare links equal to said maximum number of logical spans;

means for selecting a first physical span, said first physical span being known as a reduction span, all other physical span being known as non-reduction spans;

means for removing a first spare link from said reduction span;

means for selecting one of said non-reduction spans as a designated non-reduction span;

means for temporarily disabling the working links and the spare links associated with said designated non-reduction span;

means for monitoring the communication network to determine a network response; and means for determining, based on said network response, whether failed spans in the communication network were restored.

7. The system of claim 6, wherein all failed spans did restore, further comprising:

means for re-enabling said designated non-reduction span; and means for selecting a next non-reduction span to be said designated non-reduction span.

8. The system of claim 7, wherein all of said non-reduction spans have been used as said designated non-reduction span, further comprising:

means for removing a next spare link from said reduction span.

9. The system of claim 6, wherein all failed spans did not restore, further comprising:

means for replacing one spare link to said reduction span; and means for selecting a next physical span to be said reduction span.

10. The system of claim 6, wherein said means for selecting said reduction spans selects said physical spans sequentially in order of physical length, said first physical span being the longest.

* * * * *